(12) United States Patent
Huh et al.

(10) Patent No.: US 11,963,154 B2
(45) Date of Patent: *Apr. 16, 2024

(54) APPARATUS AND METHOD FOR MANAGING RESOURCE OF RADIO UNIT OF BASE STATION IN WIRELESS COMMUNICATION SYSTEM

(71) Applicant: Samsung Electronics Co., Ltd., Suwon-si (KR)

(72) Inventors: Sunguk Huh, Suwon-si (KR); Daejoong Kim, Suwon-si (KR); Jaeyoel Kim, Suwon-si (KR); Wonwoo Rhim, Suwon-si (KR); Namryul Jeon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/168,052

(22) Filed: Feb. 13, 2023

(65) Prior Publication Data

US 2023/0189239 A1    Jun. 15, 2023

Related U.S. Application Data

(63) Continuation of application No. 17/072,517, filed on Oct. 16, 2020, now Pat. No. 11,582,754.

(30) Foreign Application Priority Data

Oct. 18, 2019    (KR) .................. 10-2019-0130176

(51) Int. Cl.
*H04W 72/20*    (2023.01)
*H04W 72/044*    (2023.01)
*H04W 76/10*    (2018.01)

(52) U.S. Cl.
CPC ......... *H04W 72/046* (2013.01); *H04W 72/20* (2023.01); *H04W 76/10* (2018.02)

(58) Field of Classification Search
CPC ........ H04W 76/10; H04W 72/20; H04L 12/28
(Continued)

(56) References Cited

U.S. PATENT DOCUMENTS 11,582,754 B2 *  2/2023  Huh ................. H04B 7/0617
2014/0334285 A1   11/2014  Joung et al.
(Continued)

OTHER PUBLICATIONS

O-RAN Fronthaul Working Group, Control, User and Synchronization Plane Specification, ORAN-WG4.CUS.0-v02.00, 2019.
(Continued)

*Primary Examiner* — Dang T Ton
(74) *Attorney, Agent, or Firm* — Jefferson IP Law, LLP

(57) ABSTRACT

The disclosure relates to a pre 5th generation (5G) or 5G communication system to be provided for supporting higher data rates beyond 4th generation (4G) communication system such as long term evolution (LTE). A method for operating a radio unit (RU) of a base station is provided. The method includes transmitting, to a digital unit (DU), a first message comprising a value indicating the maximum number of masks for one resource area, and receiving, from the DU, a second message generated based on the value, wherein the mask may indicate resources to which the same beam is applied within the resource area.

20 Claims, 11 Drawing Sheets

(58) Field of Classification Search
USPC .................................. 370/329, 401, 496.403
See application file for complete search history.

(56) References Cited

U.S. PATENT DOCUMENTS

| | | |
|---|---|---|
| 2016/0269961 A1 | 9/2016 | Imana |
| 2018/0294869 A1 | 10/2018 | Kennard |
| 2019/0007246 A1 | 1/2019 | Fertonani et al. |
| 2019/0289497 A1 | 9/2019 | Rajagopal |
| 2021/0168858 A1 | 6/2021 | Liu et al. |
| 2023/0162552 A1* | 5/2023 | Bass .................. G07C 9/29 705/5 |

OTHER PUBLICATIONS

O-RAN Alliance Working Group 4, Management Plane Specification, ORAN-WG4.MP.0-v02.00.00, 2019.
International Search Report dated Jan. 29, 2021, issued in International Patent Application No. PCT/KR2020/014184.
Extended European Search Report dated Sep. 19, 2022, issued in a counterpart European Application No. 20875963.9.

* cited by examiner

APPARATUS AND METHOD FOR MANAGING RESOURCE OF RADIO UNIT OF BASE STATION IN WIRELESS COMMUNICATION SYSTEM

CROSS-REFERENCE TO RELATED APPLICATION(S)

This application is a continuation application of prior application Ser. No. 17/072,517, filed on Oct. 16, 2020, which will be issued as U.S. Pat. No. 11,582,754 on Feb. 14, 2023, which is based on and claimed priority under 35 U.S.C. § 119(a) of a Korean patent application number 10-2019-0130176, filed on Oct. 18, 2019, in the Korean Intellectual Property Office, the disclosure of which is incorporated by reference herein in its entirety.

BACKGROUND

1. Field

The disclosure relates to a wireless communication system. More particularly, the disclosure relates to an apparatus and a method for managing resources of a radio unit (RU) of a base station in a wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency millimeter wave (mm Wave) band (e.g., 28 GHz or 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beamforming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FQAM) and sliding window superposition coding (SWSC) as advanced coding modulation (ACM) schemes, and filter bank multi carrier (FBMC), non-orthogonal multiple access (NOMA), and sparse code multiple access (SCMA) as advanced access technologies.

A function split for functionally separating a base station is applied to 5G systems because transmission capacity increases in a wireless communication system. The base station is separated into a digital unit (DU) and a radio unit (RU) by the function split, and the RU operates under the control of the DU.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an apparatus and a method for effectively controlling a radio unit (RU) of a base station in a wireless communication system.

Another aspect of the disclosure is to provide an apparatus and a method for effectively managing resources of an RU of a base station in a wireless communication system.

Another aspect of the disclosure is to provide an apparatus and a method for preventing waste of memory of an RU of a base station in a wireless communication system.

Additional aspects will be set forth in part in the description which follows and, in part, will be apparent from the description, or may be learned by practice of the presented embodiments.

In accordance with an aspect of the disclosure, a method for operating a radio unit (RU) of a base station in a wireless communication system is provided. The method includes transmitting, to a digital unit (DU), a first message including a value indicating the maximum number of masks for one resource area, and receiving, from the DU, a second message generated based on the value, wherein the mask may indicate resources to which the same beam is applied within the resource area.

In accordance with another aspect of the disclosure, a method for operating a digital unit (DU) of a base station in a wireless communication system is proved. The method includes receiving, from a radio unit (RU), a first message including a value indicating the maximum number of masks for one resource area, and transmitting, to the RU, a second message generated based on the value, wherein the mask may indicate resources to which the same beam is applied within the resource area.

In accordance with another aspect of the disclosure, a radio unit (RU) of a base station in a wireless communication system is provided. The RU includes a transceiver and at least one processor connected to the transceiver. The at least one processor may be configured to transmit, to a digital unit (DU), a first message including a value indicating the maximum number of masks for one resource area and receive, from the DU, a second message generated based on the value, and the mask may indicate resources to which the same beam is applied within the resource area.

In accordance with another aspect of the disclosure, a digital unit (DU) of a base station in a wireless communication system is provided. The DU includes a transceiver and at least one processor connected to the transceiver. The at least one processor may be configured to receive, from a radio unit (RU), a first message including a value indicating the maximum number of masks for one resource area and transmit, to the RU, a second message generated based on the value, and the mask may indicate resources to which the same beam is applied within the resource area.

An apparatus and a method according to various embodiments make it possible to prevent unnecessary waste of resources in a radio unit (RU) of a base station.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
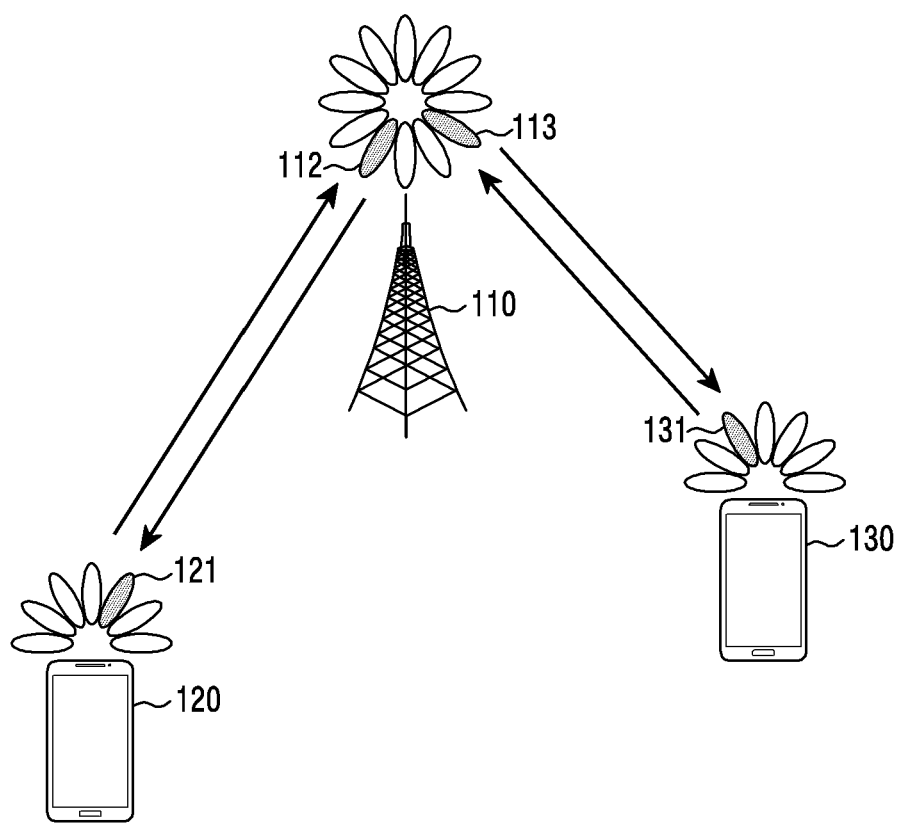
FIG. 1A illustrates a wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit the disclosure In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Hereinafter, various embodiments of the disclosure will be described based on an approach of hardware. However, various embodiments of the disclosure include a technology that uses both hardware and software, and thus the various embodiments of the disclosure may not exclude the perspective of software.

Hereinafter, the disclosure relates to an apparatus and a method for managing resources of a radio unit (RU) of a base station including a digital unit (DU) and at least one RU in a wireless communication system. Specifically, the disclosure describes a technique for managing memory resources of an RU of a base station in a wireless communication system.

Hereinafter, terms referring to signals (e.g., message, information, preamble, signal, signaling, sequence, and stream), terms referring to resources {e.g., symbol, slot, subframe, radio frame, subcarrier, resource element (RE), resource block (RB), bandwidth part (BWP), and occasion}, terms referring to the operation state (e.g., operation, and procedure), terms referring to data (e.g., user stream, quadrature (IQ) data, information, bit, symbol, and codeword), terms referring to channels, terms referring to control information {e.g., downlink control information (DCI), medium access control control element (MAC CE), and radio resource control (RRC) signaling}, terms referring to network entities, terms referring to elements of a device, and the like, which are used herein, are for the convenience of description. Therefore, the disclosure is not limited to the terms to be described later, and other terms having equivalent technical meanings may be used.

In the following description, terms "physical channel" and "signal" may be used interchangeably with "data" or "control signal". For example, a physical downlink shared channel (PDSCH) is a term that refers to a physical channel through which data is transmitted, but the PDSCH may also be used to indicate data. That is, in the disclosure, the expression "transmitting a physical channel" may be interpreted as "transmitting data or signals through a physical channel".

In addition, in the disclosure, although the expression "greater than" or "less than" has been used in order to determine whether or not a specific condition is satisfied or fulfilled, this does not exclude the expression "equal to or greater than" or "equal to or less than" The expression "equal to or greater than" may be replaced with "greater than", the expression "equal to or less than" may be replaced with "less than", and the expression "equal to or greater than and less than" may be replaced with "greater than and equal to or less than" in the conditions above.

Further, the disclosure will describe various embodiments using terms used in some communication standards {e.g., 3$^{rd}$-generation partnership project (3GPP), extensible radio access network (xRAN), or open-radio access network (O-RAN)}, but this is only an example for description. Various embodiments may be easily modified and applied to other communication systems.

FIG. 1A illustrates a wireless communication system according to an embodiment of the disclosure.

Referring to FIG. 1A, a base station 110, a terminal 120, and a terminal 130 as some of nodes using radio channels in a wireless communication system are illustrated. Although FIG. 1A shows only one base station, another base station that is the same as or similar to the base station 110 may be further included.

The base station 110 is network infrastructure that provides the terminals 120 and 130 with a wireless connection. The base station 110 has coverage, which is defined as a specific geographical area, based on the distance over which the base station 110 is able to transmit signals. The base station 110 may be referred to as, in addition to "base station", an "access point (AP)", an "eNodeB (eNB)", a "5th-generation (5G) node", a "next-generation NodeB (gNB)", a "wireless point", a "transmission/reception point (TRP)", or another term having an equivalent technical meaning.

Each of the terminal 120 and the terminal 130 is a device used by a user and performs communication with the base station 110 through a radio channel. In some cases, at least one of the terminal 120 and the terminal 130 may be operated without involvement of a user. That is, at least one of the terminal 120 and the terminal 130 is a device that performs machine-type communication (MTC), and may not be carried by a user. Each of the terminal 120 and the terminal 130 may be referred to as, in addition to "terminal", "user equipment (UE)", a "mobile station", a "subscriber station", a "remote terminal", a "wireless terminal", a "user device", or another term having an equivalent technical meaning.

The base station 110, the terminal 120, and the terminal 130 may transmit and receive wireless signals in a millimeter wave (mm Wave) band (e.g., 28 GHz, 30 GHz, 38 GHz, or 60 GHz). In this case, in order to improve the channel gain, the base station 110, the terminal 120, and the terminal 130 may perform beamforming Beamforming may include transmission beamforming and reception beamforming That is, the base station 110, the terminal 120, and the terminal 130 may impart directivity to a transmission signal or a reception signal. To this end, the base station 110 and the terminals 120 and 130 may select serving beams 112, 113, 121, and 131 through a beam searching or management procedure. After the serving beams 112, 113, 121, and 131 are selected, subsequent communication may be performed through a resource having a quasi-co-located (QCL) relationship with the resource that transmitted the serving beams 112, 113, 121, and 131.

If the large-scale characteristics of the channel that carried symbols on the first antenna port can be inferred from the channel that carried symbols on the second antenna port, it can be determined that the first antenna port and the second antenna port have a QCL relationship therebetween. For example, the large-scale characteristics may include at least one of a delay spread, a Doppler spread, a Doppler shift, an average gain, an average delay, and spatial receiver parameters.

In the disclosure, a beam means a spatial flow of a signal in a radio channel, and may be formed by one or more antennas (or antenna elements), and this formation process may be referred to as "beamforming". Beamforming may include analog beamforming and digital beamforming (e.g., precoding). Reference signal transmitted based on beamforming may include, for example, a demodulation-reference signal (DM-RS), a channel state information-reference signal (CSI-RS), a synchronization signal/physical broadcast channel (SS/PBCH), and a sounding reference signal (SRS). In addition, an information element (IE) such as a CSI-RS resource or an SRS-resource may be used as a configuration for each reference signal, and this configuration may include information associated with a beam. Information associated with a beam may denote information on whether a corresponding configuration (e.g., a CSI-RS resource) uses the same spatial domain filter as another configuration (e.g., another CSI-RS resource in the same CSI-RS resource set) or a different spatial domain filter, or information on whether or not it is quasi-co-located (QCL) with a certain reference signal and information on the QCL type (e.g., QCL type A, B, C, or D) if it is QCL.

When storing a beam profile in an RU initialization process, the base station may store a common beam vector and respective precoding vectors in the order of layers. Applying a common weight vector (precoder) to each terminal while considering respective ones of all terminals (i.e., users) as one layer may be understood as formation of a common beam applied to all of the terminals. In addition, applying a specific precoder for a multi-layer to each terminal may be understood as single-user beamforming for each terminal Meanwhile, even if a precoder is applied to the terminals, signals transmitted to some terminals are able to be spatially distinguished from signals transmitted to other terminals. In this case, the application of the precoder may be understood as multi-user beamforming.

Conventionally, in a communication system having a relatively large cell radius of a base station, each base station is provided so as to include functions of a digital processing unit {or a digital unit (DU)} and a radio frequency (RF) processing unit {or a radio unit (RU)}. However, since high frequency bands are used and the cell radius of the base station is reduced in the 4th-generation (4G) communication system and/or the communication systems subsequent thereto, the number of base stations covering a specific area increases, and the increased number of base stations lays an increased burden of the installation cost thereof on the operator. In order to minimize the installation cost of the base station, a structure in which the DU and the RU of the base station are separated so that one or more RUs are connected to one DU through a wired network and in which one or more RUs are deployed to be geographically distributed to cover a specific area has been proposed. Hereinafter, examples of a deployment structure and extension of a base station according to various embodiments will be described with reference to FIG. 1B.

Figure 1B:
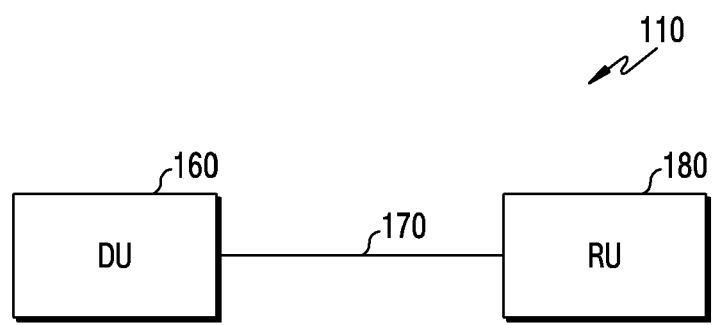
FIG. 1B shows an example of a fronthaul structure according to a function split of a base station according to an embodiment of the disclosure.

FIG. 1B shows an example of a fronthaul structure according to a function split of a base station according to an embodiment of the disclosure. Fronthaul, unlike backhaul between a base station and a core network, refers to a link between entities, i.e., a link between a wireless local area network (LAN) and a base station.

Referring to FIG. 1B, the base station 110 may include a DU 160 and an RU 180. The fronthaul 170 between the DU 160 and the RU 180 may be operated through an $F_x$ interface. For example, an interface such as an enhanced common public radio interface (eCPRI) and radio over Ethernet (ROE) may be used for the operation of the fronthaul 170.

The development of communication technology has increased traffic of mobile data, and thus a greatly increased bandwidth necessary for the fronthaul between the digital unit and the radio unit is required. In the deployment such as a centralized/cloud radio access network (C-RAN), the DU may be implemented to perform functions of packet data convergence protocol (PDCP), radio link control (RLC), media access control (MAC), and a physical layer (PHY), and the RU may be implemented to further perform functions of a PHY layer in addition to the radio frequency (RF) function.

The DU 160 may perform functions of an upper layer in a wireless network. For example, the DU 160 may perform functions of a MAC layer and some of the functions of a PHY layer. Here, some of the functions of the PHY layer indicate functions that are performed at a higher level, among the functions of the PHY layer, and may include, for example, channel encoding (or channel decoding), scrambling (or descrambling), modulation (or demodulation), and layer mapping (or layer demapping). According to an embodiment, the DU 160 may be called an "O-RAN DU (O-DU)" if it conforms to the O-RAN standard. The DU 160 may be represented by being replaced with a first network entity for a base station (e.g., a gNB) as necessary in the embodiments.

The RU 180 may perform functions of a lower layer in a wireless network. For example, the RU 180 may perform some of the functions of a PHY layer and an RF function. Here, some of the functions of the PHY layer indicate the functions that are performed at a relatively lower level than the DU 160, among the functions of the PHY layer, and may include, for example, inverse fast fourier transform (IFFT)/fast fourier transform (FFT) conversion, cyclic prefix (CP) addition/removal, and digital beamforming A detailed example of the function split will be described in detail with reference to FIG. 4. The RU 180 may be referred to as an "access unit (AU)", an "access point (AP)", a "transmission/reception point (TRP)", a "remote radio head (RRH)", a "wireless radio unit (RU)", or another term having an equivalent technical meaning According to an embodiment, if the RU 180 conforms to the O-RAN standard, it may be referred to as an "O-RAN RU (O-RU)". The DU 180 may be represented by being replaced with a second network entity for a base station (e.g., a gNB) as necessary in the embodiments.

Although it has been described in FIG. 1B that the base station includes the DU and the RU, various embodiments are not limited thereto. In some embodiments, the base station may be implemented in distributed deployment according to a centralized unit (CU) configured to perform the functions of upper layers of the access network {e.g., packet data convergence protocol (PDCP) and RRC} and a distributed unit (DU) configured to perform the functions of lower layers. In this case, the distributed unit (DU) may include the digital unit (DU) and the radio unit (RU) shown in FIG. 1B. The base station may be implemented in the structure in which the CU, the DU, and the RU are arranged in sequence between a core {e.g., 5G core (5GC) or next-generation core (NGC)} network and a wireless network (RAN). The interface between the CU and the distributed unit (DU) may be referred to as an "F1 interface".

The centralized unit (CU) may be connected to one or more DUs, and may perform functions of an upper layer rather than the DU. For example, the CU may perform functions of a radio resource control (RRC) and packet data convergence protocol (PDCP) layer, and the DU and the RU may perform functions of a lower layer. The DU may perform radio link control (RLC), media access control (MAC), and some functions (high PHY) of the physical layer (PHY), and the RU may perform the remaining functions (low PHY) of the PHY layer. In addition, for example, the digital unit (DU) may be included in the distributed unit (DU) according to implementation of distributed deployment of a base station. Hereinafter, although operations of the digital unit (DU) and the RU will be described unless otherwise defined, various embodiments may be applied to both the deployment of a base station including a CU and the deployment in which a DU is directly connected to the core network without a CU (i.e., the CU and the DU are integrated into one entity).

Figure 2:
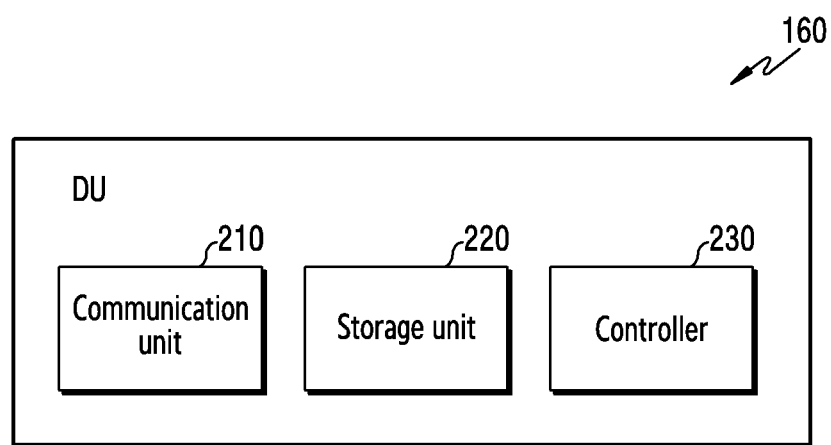
FIG. 2 illustrates a configuration of a digital unit (DU) in a wireless communication system according to an embodiment of the disclosure.

FIG. 2 illustrates a configuration of a DU in a wireless communication system according to an embodiment of the disclosure.

The configuration illustrated in FIG. 2 may be understood as the configuration of the DU 160 in FIG. 1B, which is a part of the base station. Hereinafter, the term "-unit", "-or (er)", or the like denotes a unit for processing at least one function or operation, and may be implemented as hardware, software, or a combination thereof.

Referring to FIG. 2, the DU 160 includes a communication unit 210, a storage unit 220, and a controller 230.

The communication unit 210 may perform functions for transmitting and receiving signals in a wired communication environment. The communication unit 210 may include a wired interface for controlling a direct connection between devices through a transmission medium (e.g., a copper wire or optical fiber). For example, the communication unit 210 may transmit an electrical signal to another device through a copper wire, or may perform conversion between an electrical signal and an optical signal. The communication unit 210 may be connected to a radio unit (RU). The communication unit 210 may be connected to a core network, or may be connected to a CU in a distributed deployment.

The communication unit 210 may perform functions for transmitting and receiving signals in a wireless communication environment. For example, the communication unit 210 may perform a function of conversion between a baseband signal and a bit stream according to the physical layer standard of the system. For example, when transmitting data, the communication unit 210 generates complex symbols by encoding and modulating transmission bit streams. In addition, when receiving data, the communication unit 210 restores a reception bit stream through demodulation and decoding of a baseband signal. In addition, the communication unit 210 may include a plurality of transmission/reception paths. In addition, according to an embodiment, the communication unit 210 may be connected to the core network, or may be connected to other nodes {e.g., integrated access backhaul (IAB)}.

The communication unit 210 may transmit and receive signals. To this end, the communication unit 210 may include at least one transceiver. For example, the communication unit 210 may transmit a synchronization signal, a reference signal, system information, messages, control messages, streams, control information, data, and the like. In addition, the communication unit 210 may perform beamforming.

The communication unit 210 transmits and receives signals as described above. Accordingly, all or part of the communication unit 210 may be referred to as a "transmitter", a "receiver", or a "transceiver". In addition, in the following description, transmission and reception performed through a radio channel will be used to encompass the operations performed by the communication unit 210 as described above.

Although not shown in FIG. 2, the communication unit 210 may further include a backhaul communication unit for connecting to a core network or another base station. The backhaul communication unit provides an interface for performing communication with other nodes in the network. That is, the backhaul communication unit converts a bit stream, transmitted from the base station to another node such as another access node, another base station, an upper layer node, a core network, or the like, into a physical signal, and converts physical signals received from other nodes into bit streams.

The storage unit 220 stores data such as basic programs, application programs, and configuration information for the operation of the DU 160. The storage unit 220 may include a memory. The storage unit 220 may be configured as a volatile memory, a non-volatile memory, or a combination thereof. In addition, the storage unit 220 provides the stored data in response to a request from the controller 230. According to an embodiment, the storage unit 220 may store scheduling information on each stream (e.g., beam information and antenna port information) and flow information (e.g., eAxC).

The controller 230 controls the overall operation of the DU 160. For example, the controller 230 transmits and receives signals through the communication unit 210 (or the backhaul communication unit). In addition, the controller 230 records and reads data in and from the storage unit 220. In addition, the controller 230 may perform functions of a protocol stack required for the communication standard. To this end, the controller 230 may include at least one processor. In some embodiments, the controller 230 may include a control message generator for generating a control message including resource allocation information for scheduling multiple layers and a flow identification unit for transmitting the control message. The control message generator and the flow identification unit may be a set of instructions or code stored in the storage unit 230, and may be instructions/code at least temporarily residing in the controller 230 or a storage space storing the instructions/code, or may be a part of circuits constituting the controller 230. According to various embodiments, the controller 230 may control the DU 160 to perform operations according to various embodiments described later.

The configuration of the DU 160 shown in FIG. 2 is merely exemplary, and the DU performing various embodiments is not limited thereto. That is, according to various embodiments, some elements may be added to or removed from the above configuration, or some elements thereof may be modified.

Figure 3:
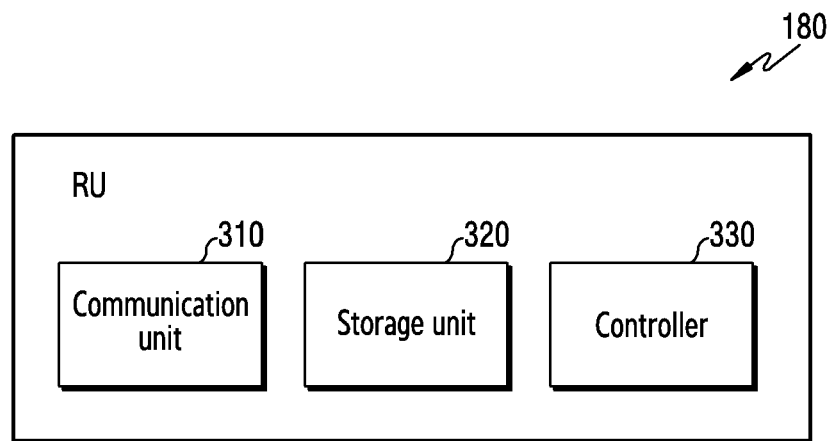
FIG. 3 illustrates a configuration of a radio unit (RU) in a wireless communication system according to an embodiment of the disclosure.

FIG. 3 illustrates a configuration of an RU in a wireless communication system according to an embodiment of the disclosure.

The configuration illustrated in FIG. 3 may be understood as the configuration of the RU 180 in FIG. 1B, which is a part of the base station. Hereinafter, the term "-unit", "-or (er)", or the like denotes a unit for processing at least one function or operation, and may be implemented as hardware, software, or a combination thereof.

Referring to FIG. 3, the RU 180 includes a communication unit 310, a storage unit 320, and a controller 330.

The communication unit 310 may perform functions for transmitting and receiving signals through a radio channel. For example, the communication unit 310 up-converts a baseband signal into an RF band signal, transmits the same through an antenna, and down-converts an RF band signal received through the antenna into a baseband signal. For example, the communication unit 310 may include a transmission filter, a reception filter, an amplifier, a mixer, an oscillator, a digital to analog converter (DAC), an analog to digital converter (ADC), and the like.

In addition, the communication unit 310 may include a plurality of transmission/reception paths. Further, the communication unit 310 may include an antenna unit. The communication unit 310 may include at least one antenna array including a plurality of antenna elements. In terms of hardware, the communication unit 310 may be configured as a digital circuit and an analog circuit {e.g., radio frequency integrated circuit (RFIC)}. The digital circuit and the analog circuit may be implemented as a single package. In addition, the communication unit 310 may include a plurality of RF chains. The communication unit 310 may perform beamforming. The communication unit 310 may apply a beamforming weight to a signal in order to impart directivity to the signal to be transmitted/received according to the configuration of the controller 330. According to an embodiment, the communication unit 310 may include a radio frequency (RF) block (or an RF unit).

In addition, the communication unit 310 may transmit and receive signals. To this end, the communication unit 310 may include at least one transceiver. The communication unit 310 may transmit downlink signals. The downlink signals may include a synchronization signal (SS), a reference signal (RS) {e.g., cell-specific reference signal (CRS) and demodulation (DM)-RS}, system information {e.g., master information block (MIB), system information block (SIB), remaining system information (RMSI), and other system information (OSI)}, a configuration message, control information, or downlink data. In addition, the communication unit 310 may receive uplink signals. The uplink signals may include a random access-related signal {e.g., random access preamble (RAP), message 1 (Msg 1), or message 3 (Msg3)}, a reference signal {e.g., sounding reference signal (SRS) or DM-RS}, and a power headroom report (PHR).

The communication unit 310 transmits and receives signals as described above. Accordingly, all or part of the communication unit 310 may be referred to as a "transmitter", a "receiver", or a "transceiver". In addition, in the following description, transmission and reception performed through a radio channel will be used to encompass the operations performed by the communication unit 310 as described above.

The storage unit 320 stores data such as basic programs, application programs, and configuration information for the operation of the RU 180. The storage unit 320 may be configured as a volatile memory, a non-volatile memory, or a combination thereof. In addition, the storage unit 320 provides the stored data in response to a request from the controller 330.

The controller 330 controls the overall operation of the RU 180. For example, the controller 330 transmits and receives signals through the communication unit 310. In addition, the controller 330 records and reads data in and from the storage unit 320. In addition, the controller 330 may perform functions of a protocol stack required for the communication standard. To this end, the controller 330 may include at least one processor. The controller 330 may include various modules for performing communication. According to various embodiments, the controller 330 may control the RU 180 to perform operations according to various embodiments described later.

Figure 4:
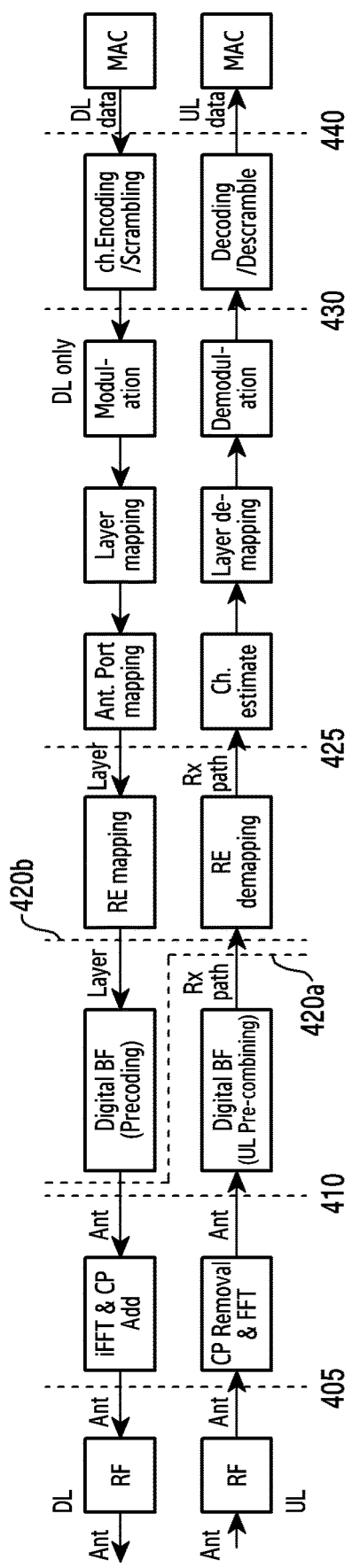
FIG. 4 illustrates an example of a function split in a wireless communication system according to an embodiment of the disclosure.

FIG. 4 illustrates an example of a function split in a wireless communication system according to an embodiment of the disclosure.

The development of wireless communication technology {e.g., the introduction of a 5th-generation (5G) communication system or a new radio (NR) communication system} has brought about an increase in the usage frequency band, and the number of RUs required to be installed has further increased due to a significant reduction in the cell radius of the base station. In addition, the amount of data transmitted in the 5G communication system has increased 10 times or more, and thus the transmission capacity of a wired network transmitted through the fronthaul has greatly increased. These factors may cause a large increase in cost for installation of the wired network in the 5G communication system. Accordingly, in order to lower the transmission capacity of the wired network and reduce the installation cost of the wired network, a technique for reducing the transmission capacity of the fronthaul by transferring some functions of a modem of the DU to the RU has been proposed, and this technique may be referred to as a "function split".

In order to relieve a burden on the DU, a method in which the role of the RU, which performs only an RF function, is expanded to some functions of the physical layer is under consideration. In this case, as the RU performs the functions of the higher layer, the throughput of the RU increases, which may increase the transmission bandwidth in the fronthaul, and may reduce constraints on the latency requirements due to a response process. Meanwhile, as the RU performs the functions of the higher layer, the virtualization gain is reduced, and the size/weight/cost of the RU increase. It is required to implement an optimal function split in consideration of trade-off of the above-mentioned advantages and disadvantages.

FIG. 4 illustrates function splits in the physical layer of the MAC layer or below. In the case of a downlink (DL) that transmits signals to a terminal through a wireless network, the base station may sequentially perform channel encoding/scrambling, modulation, layer mapping, antenna mapping, RE mapping, digital beamforming (e.g., precoding), IFFT conversion/CP addition, and RF conversion. In the case of an uplink (UL) that receives signals from a terminal through a wireless network, the base station may sequentially perform RF conversion, FFT conversion/CP removal, the digital beamforming (e.g., pre-combining), RE demapping, channel estimation, layer demapping, demodulation, and decoding/descrambling. The split between uplink functions and downlink functions may be defined in a variety of types depending on the necessity and the discussion about the specifications between supply vendors, and the like according to the above-mentioned trade-off.

Referring to FIG. 4, a first function split 405 may be a split between RF functions and PHY functions. The first function split is intended that the PHY functions are not substantially implemented in the RU, and may be referred to as, for example, "Option 8". A second function split 410 may enable the RU to perform the IFFT conversion/CP addition in the DL and the FFT conversion/CP removal in the UL, among the PHY functions, and may enable the DU to perform the remaining PHY functions. For example, the second function split 410 may be referred to as "Option 7-1". The third function split 420a may enable the RU to perform the IFFT conversion/CP addition in the DL and the FFT conversion/CP removal and the digital beamforming in the UL, among the PHY functions, and may enable the DU to perform the remaining PHY functions. For example, a third function split 420a may be referred to as "Option 7-2x Category A". A fourth function split 420b may enable the RU to perform the digital beamforming both in the DL and in the UL, and may enable DU to perform the upper PHY functions subsequent to the digital beamforming. For example, the fourth function split 420b may be referred to as "Option 7-2x Category B". A fifth function split 425 may enable the RU to perform the RE mapping (or the RE demapping) both in the DL and in the UL, and may enable the DU to perform the upper PHY functions subsequent to the RE mapping (or the RE demapping). For example, the fifth function split 425 may be referred to as "Option 7-2".

A sixth function split 430 may enable the RU to perform the modulation (or the demodulation) both in the DL and in the UL, and may enable the DU to perform the upper PHY functions subsequent to the modulation (or the demodulation). For example, the sixth function split 430 may be referred to as "Option 7-3". A seventh function split 440 may enable the RU to perform the encoding/scrambling (or decoding/descrambling) both in the DL and in the UL, and may enable the DU to perform the upper PHY functions subsequent to the modulation (or demodulation). For example, the seventh function split 440 may be referred to as "Option 6".

According to an embodiment, if it is expected to process a large-capacity signal such as FR1 MMU, a function split in a relatively higher layer (e.g., the fourth function split 420b) may be required in order to reduce the capacity of the fronthaul. In addition, a function split in an excessively high layer (e.g., the sixth function split 430) may require a complicated control interface, and may cause a burden of the implementation of the RU because a plurality of PHY processing blocks is included in the RU. Thus, an appropriate function split may be required depending on the deployment and implementation of the DU and the RU.

According to an embodiment, if it is impossible to process precoding of the data received from the DU (i.e., if the RU has a limited capability of precoding), the third function split 420a or the function splits below the same (e.g., the second function split 410) may be applied. On the other hand, if it is possible to process precoding of the data received from the DU, the fourth function split 420b or the function splits higher than the same (e.g., the sixth function split 430) may be applied. Hereinafter, although various embodiments will be described based on the third function split 420a or the fourth function split 420b unless stated otherwise in the disclosure, this is not intended to exclude the configuration of an embodiment through other function splits. For example, the embodiments to be described below may be applied to the case of the sixth function split 430 (Option 7-3).

Figure 5:
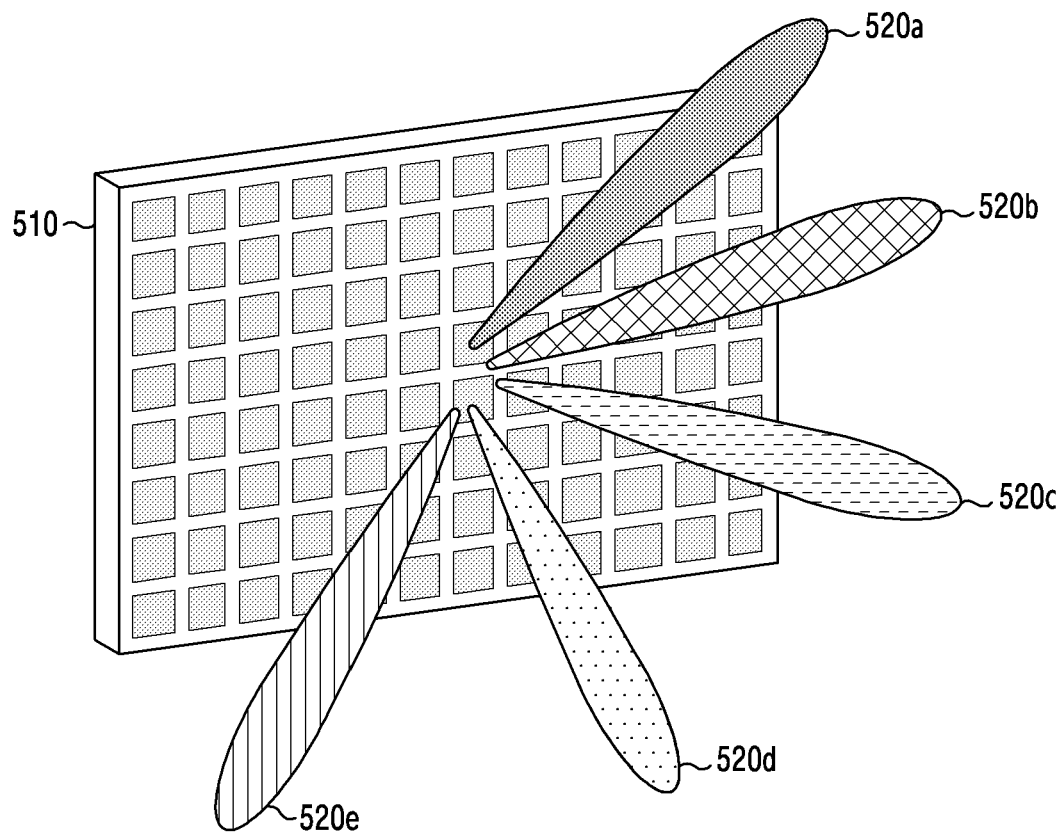
FIG. 5 illustrates an example of beams that can be formed in an RU of a base station in a wireless communication system according to an embodiment of the disclosure.

FIG. 5 illustrates an example of beams that can be formed in an RU of a base station in a wireless communication system according to an embodiment of the disclosure.

Referring to FIG. 5, the RU includes an antenna array 510 including a plurality of antenna elements. The RU may perform beamforming using the antenna array 510. For example, the RU may form a first beam 520a, a second beam 520b, a third beam 520c, a fourth beam 520d, and a fifth beam 520e having different directions from each other. Depending on the hardware capability of the RU, two or more of the first beam 520a, the second beam 520b, the third beam 520c, the fourth beam 520d, and the fifth beam 520e may be simultaneously formed. The number of beams that can be simultaneously formed may be related to the number of RF chains of the RU.

Figure 6:
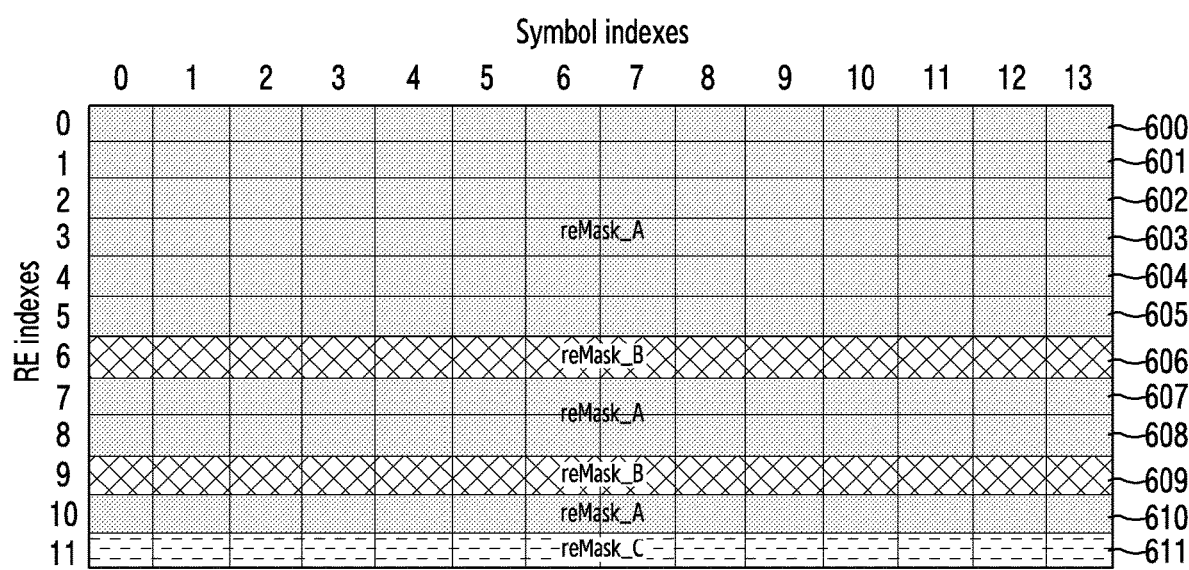
FIG. 6 illustrates examples of resource element (RE) masks in a wireless communication system according to an embodiment of the disclosure.

For example, in the case where three beams such as the first beam 520a, the second beam 520b, and the third beam 520c are able to be simultaneously formed, the beams may be applied to respective resources as shown in FIG. 6 below.

FIG. 6 illustrates examples of resource element (RE) masks in a wireless communication system according to an embodiment of the disclosure.

FIG. 6 illustrates the case in which three beams are used in the resource area including 14 symbols and 12 REs. The resource region shown in FIG. 6 may be referred to as a "section", a "resource block (RB)", or another term having an equivalent technical meaning.

The RU maps the beams to the resources according to the control of the DU. In other words, the RU transmits signals, which are transmitted through the resource, through the beams under the control of the DU. In this case, one section may be mapped to a single beam. However, the beams to be applied may be different between the resources belonging to one RB or one section. For example, referring to FIG. 6, the first beam may be mapped to the REs 600, 601, 602, 603, 604, 605, 607, 608, and 610 having indexes 0 to 5, 7, 8, and 10, the second beam may be mapped to the REs 606 and 609 having indexes 6 and 9, and the third beam may be mapped to the RE 611 having index 11. In other words, beamforming may be performed such that signals mapped to the $2^{nd}$, $5^{th}$, and $8^{th}$ subcarriers are transmitted through the first beam, such that signals mapped to the $6^{th}$ and $9^{th}$ subcarriers are transmitted through the second beam, and such that a signal mapped to the $11^{th}$ subcarrier is transmitted through the third beam. In this case, since one section is mapped to a single beam, a masking method may be used in order to indicate that the beams are mapped to some resources (e.g., REs or carriers) in one section.

For example, the DU may provide a mask value "111111011010" for the first beam while indicating that the first beam is mapped to the section show in FIG. 6. Similarly, a mask value for the second beam may be expressed as "000000100100", and a mask value for the third beam may be expressed as "000000000001". Here, the mask for the first beam may be expressed as "reMask A", the mask for the second beam may be expressed as "reMask B", and the mask for the third beam may be expressed as "reMask C". The exclusive or (XOR) operation of the three listed mask values results in "111111111111".

Using the mask values above, the RU may determine the RE, among the REs, or the subcarrier in the section to which the first beam, the second beam, and the third beam are applied based on the bit pattern of the mask values. The RU may allocate a memory space for storing at least one mask value received from the DU, and may store at least one mask value in the allocated memory space. Thereafter, in the case of transmitting a signal through the section, the RU may perform beamforming for the respective REs using the mask values and beam information. In this case, the mask values may be stored so as to be paired with section information {e.g., a section identifier (ID)}. For example, if three masks are received as shown in FIG. 6, the memory space shown in FIG. 7 may be required.

Figure 7:
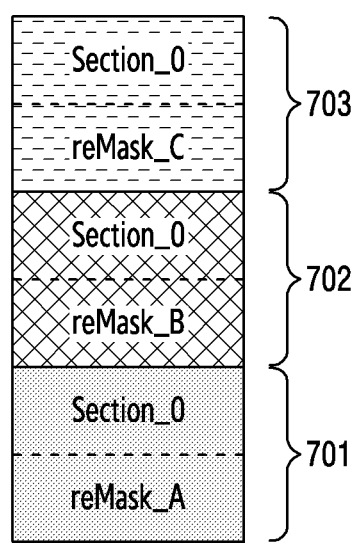
FIG. 7 illustrates an example of a memory space for storing mask values in a wireless communication system according to an embodiment of the disclosure.

FIG. 7 illustrates an example of a memory space for storing mask values in a wireless communication system according to an embodiment of the disclosure.

Referring to FIG. 7, a first space 701 is allocated to store a section ID value and a mask value of the first beam, a second space 702 is allocated to store a section ID value and a mask value of the second beam, and a third space 703 is allocated to store a section ID value and a mask value of the third beam. That is, if three mask values are received, a memory space capable of storing at least three mask values and three section ID values is required.

Meanwhile, the DU controls the RU using control signaling. Control messages received from the DU are stored in the RU, and are then decoded. In this case, a C-plane message may be stored in units of a specific time (e.g., one slot or 14 symbols). If a number of messages exceeding the memory capacity available for the RU are received within a specific time unit, some of the messages may be lost, and the decoding thereof may fail. Here, the control message transmitted from the DU may be a control (C)-plane message.

In order to prevent the situation in which a number of messages exceeding an available memory capacity are transmitted, the RU may report the available memory capacity to the DU. Accordingly, the DU may transmit a control message in consideration of the available memory capacity of the RU. In this case, the message transmitted from the RU may be a management (M)-plane message.

If there is no operation of indicating the available memory capacity of the RU, the DU may transmit a control message without consideration of the available memory capacity of the RU. In this case, the RU is required to allocate a memory space according to the maximum size of the message that is transmittable by the DU. For example, in the case of the RE mask, since 12 Res are included in one section, it may be expected to receive a control message including up to 12 mask values. Securing the memory space for storing up to 12 mask values in preparation of up to 12 mask values may cause an increase in cost for the implementation of the RU.

Furthermore, securing of the memory space for storing 12 mask values may cause unnecessary waste of the memory space. Among the downlink channels currently defined in the $5^{th}$-generation (5G) new radio (NR) standard, the combinations thereof, which may be allocated to one section, may not be infinite. The combinations shown in Table 1 may be considered even if they may vary depending on the specific implementation.

TABLE 1

| | Combinations of channels | Number of channels |
|---|---|---|
| 1 | PDSCH + DMRS for PDSCH | 2 |
| 2 | PDSCH + PT-RS | 2 |
| 3 | PDSCH + CSI-RS | 2 |
| 4 | DMRS for PDSCH + CSI-RS | 2 |
| 5 | PDSCH + DMRS for PDSCH + CSI-RS | 3 |
| 6 | PDSCH + PT-RS + CSI-RS | 3 |
| 7 | PDSCH + DMRS for PDCCH | 2 |
| 8 | SSS + PBCH | 2 |

In the case of considering the combinations shown in Table 1 above, the maximum number of transmittable channels in one section is 3. In this case, securing the memory space for storing four or more mask values may lead to the waste of the memory space because no more than three beams are used in one section.

In addition, if there is no operation of indicating the available memory capacity of the RU, the DU may transmit a message having the size exceeding the available memory capacity of the RU. In this case, at least a portion of the message may not be stored, and the decoding thereof may fail. For example, if the DU transmits a control message including three mask values in the state in which the RU secured the memory space capable of storing only two mask values, the decoding of the control message may fail.

Figure 8:
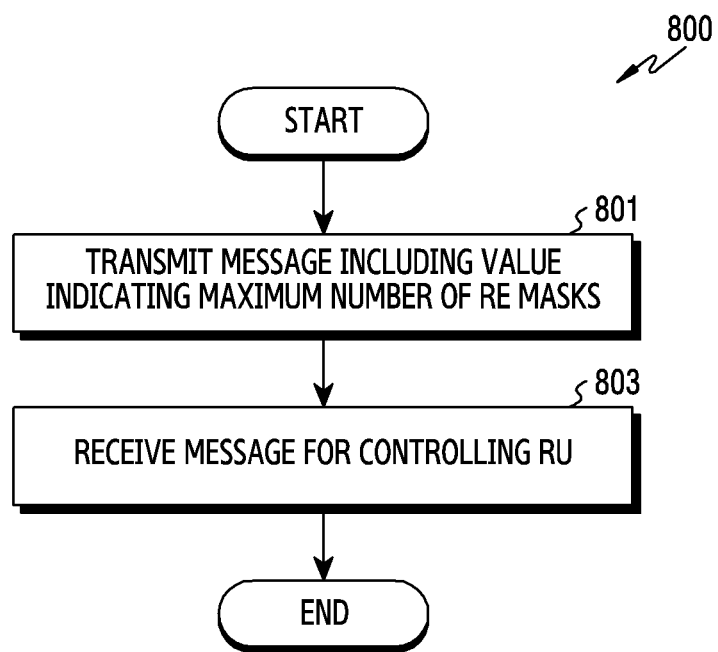
FIG. 8 is a flowchart illustrating operation of an RU in a wireless communication system according to an embodiment of the disclosure.

FIG. 8 is a flowchart illustrating operation of an RU in a wireless communication system according to an embodiment of the disclosure.

FIG. 8 illustrates a method of operating the RU 180 of the base station 110.

Referring to FIG. 8, in a method 800, in operation 801, the RU transmits a message including a value indicating the maximum number of the RE masks. Here, the maximum number of RE masks may be understood as the number of pairs between mask values that can be stored in the RU and section ID values. That is, the RU transmits, to the DU, a value corresponding to the capacity of the memory space allocable to store the RE mask values in the memory.

In operation 803, the RU may receive a message for controlling the RU. The RU may store the received message in the memory space. For example, the message may include scheduling information associated with the operation of the RU. Specifically, the message may include at least one RE mask value. The RU may obtain information included in the message by decoding the message stored in the memory space.

Figure 9:
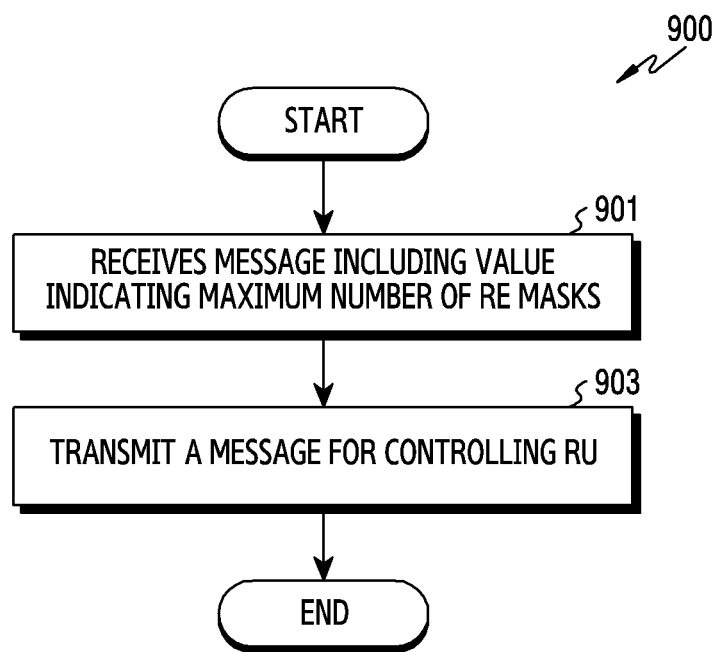
FIG. 9 is a flowchart illustrating operation of a digital unit (DU) in a wireless communication system according to an embodiment of the disclosure.

FIG. 9 is a flowchart illustrating operation of a digital unit (DU) in a wireless communication system according to an embodiment of the disclosure.

FIG. 9 illustrates a method of operating the DU 170 of the base station 110.

Referring to FIG. 9, in a method 900, in operation 901, the DU receives a message including a value indicating the maximum number of RE masks from the RU. Here, the maximum number of RE masks may be understood as the number of pairs between mask values that the RU is able to store and section ID values. That is, the DU receives, from the RU, a value corresponding to the capacity of the memory space allocable to store the RE mask values in the memory.

In operation 903, the DU transmits a message for controlling the RU. For example, the message may include scheduling information associated with the operation of the RU. In this case, the DU may limit the size of the message, based on the value received in operation 901. To this end, in the scheduling operation, the DU may perform scheduling such that beams exceeding the number of RE masks corresponding to the value received in operation 901 are not used in one section.

Figure 10:
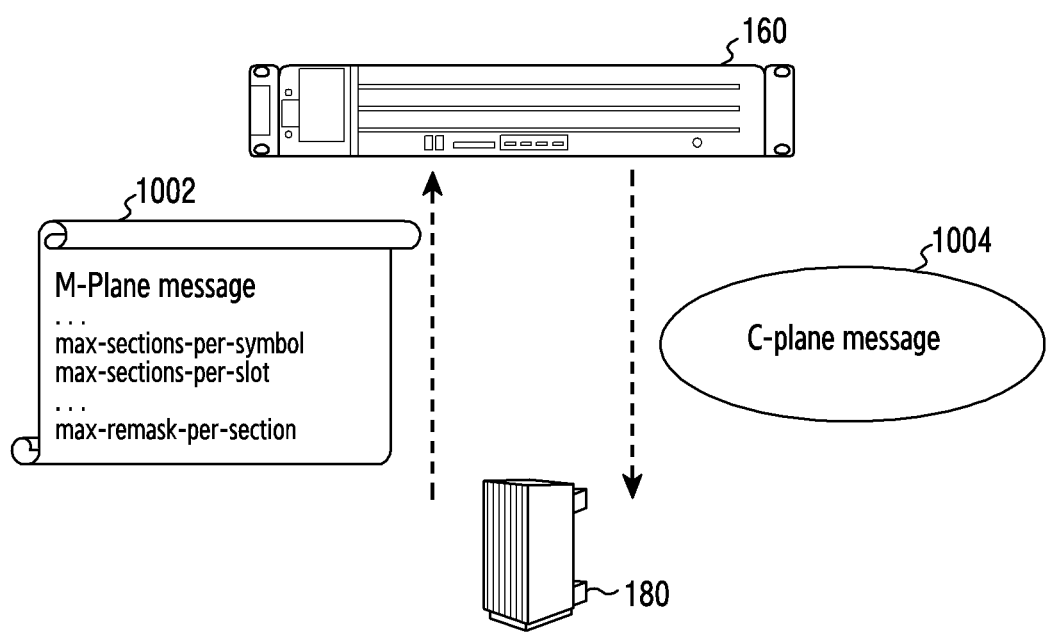
FIG. 10 illustrates signal exchange between a DU and an RU in a wireless communication system according to an embodiment of the disclosure.

FIG. 10 illustrates signal exchange between a DU and an RU in a wireless communication system according to an embodiment of the disclosure.

FIG. 10 illustrates a specific example of the operation of the RU 180 shown in FIG. 8 and the operation of the DU 160 shown in FIG. 9.

Referring to FIG. 10, the RU 180 may transmit an M-plane message 1002 to the DU 160. The M-plane message 1002 may include information on the state or resources of the RU 180. For example, the M-plane message 1002 may include at least one of max-sections-per-symbol" indicating the maximum number of sections per symbol, "max-sections-per-slot" indicating the maximum number of sections per slot, and "max-remask-per-section" indicating the maximum number of RE masks per section. The M-plane message 1002 may be transmitted during the procedure in which the RU 180 and the DU 160 establish an initial connection therebetween or after the completion thereof. Thereafter, the DU 160 may transmit a C-plane message 1004 for controlling the operation of the RU 180. For example, the C-plane message 1004 may include scheduling information (e.g., RE masks) for the operation of the RU 180.

In the procedure shown in FIG. 10, the M-plane message 1002 may further include information shown in Table 2 below.

TABLE 2

```
module: o-ran-uplane-conf
    +--rw user-plane-configuration
        +--rw low-level-tx-links* [name]
        |  +--rw name                       string
        |  +--rw processing-element         -> /o-ran-pe:processing-elements/ru-elements/name
        |  +--rw tx-array-carrier           -> /user-plane-configuration/tx-array-carriers/name
        |  +--rw low-level-tx-endpoint      -> /user-plane-configuration/low-level-tx-endpoints/name
        +--rw low-level-rx-links* [name]
        |  +--rw name                       string
        |  +--rw processing-element         -> /o-ran-pe:processing-elements/ru-elements/name
        |  +--rw rx-array-carrier           -> /user-plane-configuration/rx-array-carriers/name
        |  +--rw low-level-rx-endpoint      -> /user-plane-configuration/low-level-rx-endpoints/name
        |  +--rw user-plane-uplink-marking? -> /o-ran-pe:processing-elements/enhanced-uplane-mapping/uplane-mapping/up-marking-name
        +--ro endpoint-types* [id]
        |  +--ro id                                         uint16
        |  +--ro supported-section-types* [section-type]
        |  +--ro section-type                     uint8
        |  +--ro supported-section-extensions*    uint8
        |  +--ro supported-frame-structures*                uint8
        |  +--ro managed-delay-support?                     enumeration
        |  +--ro multiple-numerology-supported?             boolean
        |  +--ro max-numerology-change-duration?            uint16
        |  +--ro max-control-sections-per-data-section?    uint8
        |  +--ro max-sections-per-symbol?                   uint16
        |  +--ro max-sections-per-slot?                     uint16
        |  +--ro max-reMasks-per-section?                   unit16
        |  +--ro max-beams-per-symbol?                      uint16
        |  +--ro max-beams-per-slot?                        uint16
        |  +--ro max-prb-per-symbol?                        uint16
        |  +--ro prb-capacity-allocation-granularity*  uint16
        |  +--ro max-numerologies-per-symbol?               uint16
        +--ro endpoint-capacity-sharing-groups* [id]
        |  +--ro id                                         uint16
        |  +--ro max-control-sections-per-data-section?    uint8
        |  +--ro max-sections-per-symbol?                   uint16
        |  +--ro max-sections-per-slot?                     uint16
        |  +--ro max-reMasks-per-section?                   unit16
```

TABLE 2-continued

| | | |
|---|---|---|
| \| +--ro max-beams-per-symbol? | uint16 | |
| \| +--ro max-beams-per-slot? | uint16 | |
| \| +--ro max-prb-per-symbol? | uint16 | |
| \| +--ro max-numerologies-per-symbol? | uint16 | |

In the procedure shown in FIG. 10, the C-plane message 1004 may be configured as shown in Table 3, Table 4, Table 5, or Table 6 below.

TABLE 3

| Section Type 5: UE scheduling information conveyance | | | | | | | | | |
|---|---|---|---|---|---|---|---|---|---|
| 0 (msb) | 1 | 2 | 3 | 4 | 5 | 6 | 7 (lsb) | # of bytes | |
| transport header, see section 3.1.3 | | | | | | | | 8 | Octet 1 |
| dataDirection | payloadVersion | | | filterIndex | | | | 1 | Octet 9 |
| frameId | | | | | | | | 1 | Octet 10 |
| subframeId | | | | slotId | | | | 1 | Octet 11 |
| slotId | | | startSymbolid | | | | | 1 | Octet 12 |
| numberOfsections | | | | | | | | 1 | Octet 13 |
| sectionType = 5 | | | | | | | | 1 | Octet 14 |
| udCompHdr | | | | | | | | 1 | Octet 15 |
| reserved | | | | | | | | 1 | Octet 16 |
| sectionId | | | | | | | | 1 | Octet 17 |
| sectionId | | | rb | symInc | startPrbc | | | 1 | Octet 18 |
| startPrbc | | | | | | | | 1 | Octet 19 |
| numPrbc | | | | | | | | 1 | Octet 20 |
| reMask[11:4] | | | | | | | | 1 | Octet 21 |
| reMask[3:0] | | | | numSymbol | | | | 1 | Octet 22 |
| ef | | | ueId[14:8] | | | | | 1 | Octet 23 |
| ueId[7:0] | | | | | | | | 1 | Octet 24 |
| section extensions as indicated by "ef" | | | | | | | | var | Octet 25 |
| . . . | | | | | | | | | |
| sectionId | | | | | | | | 1 | Octet N |
| sectionId | | | rb | symInc | startPrbc | | | 1 | N + 1 |
| startPrbc | | | | | | | | 1 | N + 2 |
| numPrbc | | | | | | | | 1 | N + 3 |
| reMask[11:4] | | | | | | | | 1 | N + 4 |
| reMask[3:0] | | | | numSymbol | | | | 1 | N + 5 |
| ef | | | ueId[14:8] | | | | | 1 | N + 6 |
| ueId[7:0] | | | | | | | | 1 | N + 7 |
| section extensions as indicated by "ef" | | | | | | | | var | N + 8 Octet M |

In Table 3, the value of the parameter "ef" of Octet 23 determines whether or not to perform section extension. If "ef=0", the section extension is not performed, and if "ef=1", the section extension is performed, that is, "reMask" is added. In other words, the section extension may be performed in order to add "reMask". In this case, in the case of generating and transmitting the C-plane message, the DU performs the section extension in consideration of the available memory capacity of the RU. For example, if the section extension is not performed even once, Octet 23 includes "ef=0", and Octet 21 and Octet 22 include "reMask=111111111111", which indicates that only one beam is used in the corresponding section.

The message structure in Table 3 may be changed to the message structure shown in Table 4 or 5 below according to the section type. Table 4 shows messages according to section type "0", Table 5 shows messages according to section type "1", and Table 6 shows messages according to section type "3".

TABLE 4

| Section Type 0: idle/guard periods | | | | | | | | | |
|---|---|---|---|---|---|---|---|---|---|
| 0 (msb) | 1 | 2 | 3 | 4 | 5 | 6 | 7 (lsb) | # of bytes | |
| transport header, see section 3.1.3 | | | | | | | | 8 | Octet 1 |
| dataDirection | payloadVersion | | | filterIndex | | | | 1 | Octet 9 |
| frameId | | | | | | | | 1 | Octet 10 |
| subframeId | | | | slotId | | | | 1 | Octet 11 |
| slotId | | | startSymbolid | | | | | 1 | Octet 12 |
| numberOfsections | | | | | | | | 1 | Octet 13 |
| sectionType = 0 | | | | | | | | 1 | Octet 14 |
| timeOffset | | | | | | | | 2 | Octet 15 |
| frameStructure | | | | | | | | 1 | Octet 17 |
| cpLength | | | | | | | | 2 | Octet 18 |

TABLE 4-continued

| Section Type 0: idle/guard periods | | | | | | | | # of bytes | |
|---|---|---|---|---|---|---|---|---|---|
| 0 (msb) | 1 | 2 | 3 | 4 | 5 | 6 | 7 (lsb) | | |
| Reserved | | | | | | | | 1 | Octet 20 |
| sectionId | | | | | | | | 1 | Octet 21 |
| sectionId | | | | rb | symInc | startPrbc | | 1 | Octet 22 |
| startPrbc | | | | | | | | 1 | Octet 23 |
| numPrbc | | | | | | | | 1 | Octet 24 |
| reMask[11:4] | | | | | | | | 1 | Octet 25 |
| reMask[3:0] | | | | numSymbol | | | | 1 | Octet 26 |
| ef | | reserved (7 bits) | | | | | | 1 | Octet 27 |
| reserved (8 bits) | | | | | | | | 1 | Octet 28 |
| section extensions as indicated by "ef" if any | | | | | | | | var | Octet 29 |
| . . . | | | | | | | | | |
| sectionId | | | | | | | | 1 | Octet N |
| sectionId | | | | rb | symInc | startPrbc | | 1 | N + 1 |
| startPrbc | | | | | | | | 1 | N + 2 |
| numPrbc | | | | | | | | 1 | N + 3 |
| reMask[11:4] | | | | | | | | 1 | N + 4 |
| reMask[3:0] | | | | numSymbol | | | | 1 | N + 5 |
| ef | | reserved (7 bits) | | | | | | 1 | N + 6 |
| reserved (8 bits) | | | | | | | | 1 | N + 7 |
| section extensions as indicated by "ef" if any | | | | | | | | var | N + 8 Octet M |

TABLE 5

| Section Type 1: DL/UL control msgs | | | | | | | | # of bytes | |
|---|---|---|---|---|---|---|---|---|---|
| 0 (msb) | 1 | 2 | 3 | 4 | 5 | 6 | 7 (lsb) | | |
| transport header, see section 3.1.3 | | | | | | | | 8 | Octet 1 |
| dataDirection | | payloadVersion | | | filterIndex | | | 1 | Octet 9 |
| frameId | | | | | | | | 1 | Octet 10 |
| subframeId | | | | slotId | | | | 1 | Octet 11 |
| slotId | | | startSymbolid | | | | | 1 | Octet 12 |
| numberOfsections | | | | | | | | 1 | Octet 13 |
| sectionType = 1 | | | | | | | | 1 | Octet 14 |
| udCompHdr | | | | | | | | 1 | Octet 15 |
| reserved | | | | | | | | 1 | Octet 16 |
| sectionId | | | | | | | | 1 | Octet 17 |
| sectionId | | | | rb | symInc | startPrbc | | 1 | Octet 18 |
| startPrbc | | | | | | | | 1 | Octet 19 |
| numPrbc | | | | | | | | 1 | Octet 20 |
| reMask[11:4] | | | | | | | | 1 | Octet 21 |
| reMask[3:0] | | | | numSymbol | | | | 1 | Octet 22 |
| ef | | beamId[14:8] | | | | | | 1 | Octet 23 |
| beamId[7:0] | | | | | | | | 1 | Octet 24 |
| section extensions as indicated by "ef" | | | | | | | | var | Octet 25 |
| . . . | | | | | | | | | |
| sectionId | | | | | | | | 1 | Octet N |
| sectionId | | | | rb | symInc | startPrbc | | 1 | N + 1 |
| startPrbc | | | | | | | | 1 | N + 2 |
| numPrbc | | | | | | | | 1 | N + 3 |
| reMask[11:4] | | | | | | | | 1 | N + 4 |
| reMask[3:0] | | | | numSymbol | | | | 1 | N + 5 |
| ef | | beamId[14:8] | | | | | | 1 | N + 6 |
| beamId[7:0] | | | | | | | | 1 | N + 7 |
| section extensions as indicated by "ef" | | | | | | | | var | N + 8 Octet M |

TABLE 6

| Section Type 3: PRACH & mixed-numerology | | | | | | | | # of bytes | |
|---|---|---|---|---|---|---|---|---|---|
| 0 (msb) | 1 | 2 | 3 | 4 | 5 | 6 | 7 (lsb) | | |
| transport header, see section 3.1.3 | | | | | | | | 8 | Octet 1 |
| dataDirection | | payloadVersion | | | filterIndex | | | 1 | Octet 9 |
| frameId | | | | | | | | 1 | Octet 10 |

TABLE 6-continued

Section Type 3: PRACH & mixed-numerology

| 0 (msb) | 1 | 2 | 3 | 4 | 5 | 6 | 7 (lsb) | # of bytes | |
|---|---|---|---|---|---|---|---|---|---|
| subframeId | | | | | slotId | | | 1 | Octet 11 |
| slotId | | | | startSymbolid | | | | 1 | Octet 12 |
| numberOfsections | | | | | | | | 1 | Octet 13 |
| sectionType = 3 | | | | | | | | 1 | Octet 14 |
| timeOffset | | | | | | | | 2 | Octet 15 |
| frameStructure | | | | | | | | 1 | Octet 17 |
| cpLength | | | | | | | | 2 | Octet 18 |
| udCompHdr | | | | | | | | 1 | Octet 20 |
| sectionId | | | | | | | | 1 | Octet 21 |
| sectionId | | | | rb | symInc | startPrbc | | 1 | Octet 22 |
| startPrbc | | | | | | | | 1 | Octet 23 |
| numPrbc | | | | | | | | 1 | Octet 24 |
| reMask[11:4] | | | | | | | | 1 | Octet 25 |
| reMask[3:0] | | | | numSymbol | | | | 1 | Octet 26 |
| ef | | | | beamId[14:8] | | | | 1 | Octet 27 |
| beamId[7:0] | | | | | | | | 1 | Octet 28 |
| freqOffset | | | | | | | | 3 | Octet 29 |
| reserved (8 bits) | | | | | | | | 1 | Octet 32 |
| section extensions as indicated by "ef" | | | | | | | | var | Octet 33 |
| ... | | | | | | | | | |
| sectionId | | | | | | | | 1 | Octet N |
| sectionId | | | | rb | symInc | startPrbc | | 1 | N + 1 |
| startPrbc | | | | | | | | 1 | N + 2 |
| numPrbc | | | | | | | | 1 | N + 3 |
| reMask[11:4] | | | | | | | | 1 | N + 4 |
| reMask[3:0] | | | | numSymbol | | | | 1 | N + 5 |
| ef | | | | beamId[14:8] | | | | 1 | N + 6 |
| beamId[7:0] | | | | | | | | 1 | N + 7 |
| freqOffset | | | | | | | | 3 | N + 8 |
| reserved (8 bits) | | | | | | | | 1 | N + 11 |
| section extensions as indicated by "ef" | | | | | | | | var | N + 12 |
| | | | | | | | | | Octet M |

As described in the various embodiments above, the RU provides the DU with information on the maximum number of storable RE masks so that a control message may be generated and transmitted within the range of the available memory capacity of the RU. That is, the information on the maximum number of RE masks may be understood as the value indicating information on the available memory capacity.

Accordingly, according to another embodiment, the maximum number of RE masks may be replaced with information that explicitly or implicitly indicates the available memory capacity. The available memory capacity to be signaled may be the total available memory capacity for storing the control messages, or may be the available memory capacity allocable to a specific information item (e.g., an RE mask value). The specific information item may be information on the RE mask or other information.

In addition, according to another embodiment, the value indicating the maximum number of RE masks may be replaced with the value related to the number of other parameters other than the RE mask. Since the number of RE masks may be repeatedly included in the control message, the maximum number of RE masks may affect the memory capacity. Accordingly, the number of other parameters that can be repeatedly included in the control message may be reported in parallel with the RE mask or as a replacement therefor. However, even for the parameter that is not repeated, information indicating whether or not to allocate a memory space for storing the parameter may be reported. That is, the value indicating the presence or absence thereof, instead of the number thereof, may be used.

Methods disclosed in the claims and/or methods according to various embodiments described in the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a radio unit (RU) in a wireless communication system, the method comprising:
   transmitting, to a digital unit (DU), a first message comprising a value indicating a maximum number of resource element (RE) mask for a section; and
   receiving, from the DU, a second message generated based on the value,
   wherein the maximum number of the RE mask for the section is a number of at least one pair of the RE mask and a section identifier (ID), and
   wherein the RE mask indicates at least one RE associated with one beam within the section.

2. The method of claim 1,
   wherein the first message further comprises at least one of a value indicating a maximum number of the section per symbol, or a value indicating a maximum number of the section per slot.

3. The method of claim 1, wherein the maximum number of the RE mask is determined based on an available memory capacity of the RU.

4. The method of claim 1, wherein the second message comprises a value indicating a number of RE mask equal to or less than the maximum number of the RE mask.

5. The method of claim 1, wherein the first message is transmitted during a procedure in which the RU and the DU establish an initial connection.

6. The method of claim 1, wherein the first message comprises a management (M)-plane message.

7. A method performed by a digital unit (DU) in a wireless communication system, the method comprising:
   receiving, from a radio unit (RU), a first message comprising a value indicating a maximum number of resource element (RE) mask for a section; and
   transmitting, to the RU, a second message generated based on the value,
   wherein the maximum number of the RE mask for the section is a number of at least one pair of the RE mask and a section identifier (ID), and
   wherein the RE mask indicates at least one RE associated with one beam within the section.

8. The method of claim 7,
   wherein the first message further comprises at least one of a value indicating a maximum number of the section per symbol, or a value indicating a maximum number of the section per slot.

9. The method of claim 7, wherein the maximum number of the RE mask is determined based on an available memory capacity of the RU.

10. The method of claim 7, wherein the second message comprises a value indicating a number of RE mask equal to or less than the maximum number of the RE mask.

11. The method of claim 7, wherein the first message is received during a procedure in which the RU and the DU establish an initial connection.

12. The method of claim 7, wherein the first message comprises a management (M)-plane message.

13. The method of claim 7, further comprising:
    storing the value indicating the maximum number of the RE mask for the section.

14. A radio unit (RU) in a wireless communication system, the RU comprising:
    a transceiver; and
    a controller coupled with the transceiver,
    and configured to:
       transmit, to a digital unit (DU), a first message comprising a value indicating a maximum number of resource element (RE) mask for a section, and
       receive, from the DU, a second message generated based on the value,
    wherein the maximum number of the RE mask for the section is a number of at least one pair of the RE mask and a section identifier (ID), and
    wherein the RE mask indicates at least one RE associated with one beam within the section.

15. The method of claim 1, further comprising:
    storing at least one value of the RE mask included in the second message in unit of time.

16. The method of claim 1, wherein the second message comprises a control (C)-plane message, and includes a section extension information.

17. The method of claim 16, wherein the section extension information includes information indicating the RE mask, and is associated with one of a section type 0, a section type 1, or a section type 3.

18. The method of claim 7, wherein the second message comprises a control (C)-plane message, and includes a section extension information.

19. The method of claim 18, wherein the section extension information includes information indicating the RE mask, and is associated with one of a section type 0, a section type 1, or a section type 3.

20. A digital unit (DU) in a wireless communication system, the DU comprising:
    a transceiver; and
    a controller coupled with the transceiver, and configured to:
       receive, from a radio unit (RU), a first message comprising a value indicating a maximum number of resource element (RE) mask for a section, and
       transmit, to the RU, a second message generated based on the value,
    wherein the maximum number of the RE mask for the section is a number of at least one pair of the RE mask and a section identifier (ID), and
    wherein the RE mask indicates at least one RE associated with one beam within the section.

* * * * *